(12) United States Patent
Chang et al.

(10) Patent No.: US 8,485,033 B2
(45) Date of Patent: Jul. 16, 2013

(54) TESTING TECHNIQUE FOR DETERMINATION OF THE DYNAMIC POISSON'S RATIO OF A MATERIAL WITH LONGITUDINAL AND CROSS-SECTIONAL RESONANT FREQUENCIES OF A CIRCULAR SOLID ROD SPECIMEN

(75) Inventors: Ta-Peng Chang, Taipei (TW); Jin-Jun Wang, Taoyuan County (TW)

(73) Assignee: National Taiwan University of Science and Technology, Taipei (TW)

( * ) Notice: Subject to any disclaimer, the term of this patent is extended or adjusted under 35 U.S.C. 154(b) by 323 days.

(21) Appl. No.: 13/083,614

(22) Filed: Apr. 11, 2011

(65) Prior Publication Data

US 2012/0036932 A1 Feb. 16, 2012

(30) Foreign Application Priority Data

Aug. 16, 2010 (TW) .............................. 99127309 A

(51) Int. Cl.
*G01H 13/00* (2006.01)
(52) U.S. Cl.
USPC ........................................................ 73/579

(58) Field of Classification Search
USPC ................................................ 73/579, 12.01
See application file for complete search history.

(56) References Cited

U.S. PATENT DOCUMENTS 7,590,495 B2 * 9/2009 Hull ................................ 73/579
2007/0157698 A1 * 7/2007 Allaire et al. ................. 73/12.01

OTHER PUBLICATIONS

Springer Handbook of Materials Measurement Methods, Chapter 7.1.4, "Dynamic Methods of Determining Elastic Constants," Springer Berlin Heidelberg (2006), pp. 293-296.*

* cited by examiner

*Primary Examiner* — John Chapman, Jr.
(74) *Attorney, Agent, or Firm* — Jianq Chyun IP Office

(57) ABSTRACT

A method of determining the dynamic Poisson's ratio of a material with a circular solid rod is provided. The method includes at least the following steps. 1. a circular solid rod specimen with the material to be determined for its dynamic Poisson's ratio is manufactured; 2. the length and diameter of the circular solid rod specimen is measured; 3. both the fundamental longitudinal and cross-sectional resonant frequencies of the circular solid rod specimen are obtained through experiments; 4. the dynamic Poisson's ratio of the material according to the formula provided in this invention is calculated; 5. the validity of geometric dimension of the circular solid rod specimen is justified.

5 Claims, 4 Drawing Sheets

US 8,485,033 B2

TESTING TECHNIQUE FOR DETERMINATION OF THE DYNAMIC POISSON'S RATIO OF A MATERIAL WITH LONGITUDINAL AND CROSS-SECTIONAL RESONANT FREQUENCIES OF A CIRCULAR SOLID ROD SPECIMEN

CROSS-REFERENCE TO RELATED APPLICATION

This application claims the priority benefit of Taiwan application serial no. 99127309, filed Aug. 16, 2010. The entirety of the above-mentioned patent application is hereby incorporated by reference herein and made a part of this specification.

BACKGROUND OF THE INVENTION

1. Field of the Invention

The invention is directed to a method for determining the dynamic Poisson's ratio of a material through nondestructive testing.

2. Description of Related Art

When planning out the material of different types of construction buildings, mechanical equipment, tools, electrical products, mold assemblies, electric equipment, and others, deformation results when sustaining temperature, weight, static, and dynamic loads from external forces, and so the Poisson's ratio of the equipment composition material must first be determined. Generally, there are two methods to measure the Poisson's ratio of a material: static Poisson's ratio measurement method and dynamic Poisson's ratio measurement method. The dynamic Poisson's ratio measurement method is a nondestructive test. Because the tested specimen will not be damaged, and the testing process is relatively quick, the dynamic Poisson's ratio measurement method is widely received by industry and education by applying to practical applications and educational research.

The CNS (Chinese National Standards) standard does not have related determining methods for measuring the dynamic Poisson's ratio of a material. In the United States, in the ASTM E1876 (Standard Test Method for Dynamic Young's Modulus, Shear Modulus, and Poisson's ratio by Impulse Excitation of Vibration) standard, even though there is an explanation for a determining method for measuring the dynamic Poisson's ratio of a material, when the determining method is put in practice, the dynamic elasticity modulus and dynamic shear modulus of a solid long rod material specimen must first be determined, then by repeated calculations through an iteration method, the dynamic Poisson's ratio of the material is obtained. Besides the determination method being complicated, the ASTM E1876 belongs to a technique of free resonance by impulse excitation type method, and the standard especially explains that this method is difficult to precisely obtain the dynamic shear modulus of a circular rod, thus causing the standard obtained dynamic Poisson's ratio of a material to have uncertain factors.

Furthermore, when using the determining method of ASTM E1876 to determine the dynamic Poisson's ratio of a circular solid rod specimen, the fundamental longitudinal resonant frequency or the fundamental flexural resonant frequency of a circular solid rod specimen must first be measured, to determine the dynamic elasticity modulus. Then the fundamental torsional resonant frequency is measured, to determine the dynamic shear modulus. After measuring the dynamic elasticity modulus and the dynamic shear modulus, the dynamic Poisson's ratio of the circular solid rod is calculated. In the standard, the testing specimen length/diameter ratio is required to be greater than 20, thus the difficulty in the fabrication of a circular rod specimen is increased. Otherwise, iterated calculation in the method is required until the deviation is less than 2%, and a more precise dynamic Poisson's ratio of a material is obtained.

Nevertheless, when determining the circular solid rod specimen dynamic shear modulus, the required torsional resonant frequency is difficult to obtain through testing. In the ASTM E1876 standard, the determination method of the torsional resonant frequency of a specimen is not clearly explained through drawings. Thus, the invention further explains through, for example, the ASTM C215 (Standard Test Method for Fundamental Transverse, Longitudinal, and Torsional Resonant Frequencies of Concrete Specimens) standard to measure the dynamic shear modulus of a solid rod specimen. As shown in FIG. 1A and FIG. 1B, the measuring method sticks an accelerometer receiver 110 onto an L shaped metal material 120 using hot glue. Then, the L shaped metal material 120 is fixed on a rod specimen 130 surface, and tangent line directions of the section of the accelerometer receiver 110 and the rod specimen 130 section maintain parallel. When undergoing impact, the impact force needs to be acted along the tangent direction of the surface of the rod specimen 130. Thus, processes of the determining method are complicated and difficult, and the torsional resonant frequency is hard to obtain.

SUMMARY OF THE INVENTION

The invention provides a simpler method for determining a more precise dynamic Poisson's ratio of a material.

The invention provides a method for determining the dynamic Poisson's ratio of a material. The method includes at least the following steps. A circular solid rod specimen with the material to be determined for its dynamic Poisson's ratio is manufactured, and the length L and diameter D of the circular solid rod specimen is measured; the fundamental longitudinal resonant frequency $f_l$ of the circular solid rod specimen is obtained; the fundamental cross-sectional resonant frequency $f_d$ according to $$0.87 \frac{L}{D} f_l \le f_d \le 1.05 \frac{L}{D} f_l$$

is determined; the unitless rod specimen parameter κ according to $$\kappa = \frac{f_d D}{f_l L}$$

is obtained, and then the dynamic Poisson's ratio $v_D$ is obtained according to $$v_D = -1.0477 + \frac{1.1582}{\kappa^2};$$

the validity of the dynamic Poisson's ratio $v_D$ is justified, where if $$\frac{L}{D} \geq 25v_D$$

then the dynamic Poisson's ratio $v_D$ is valid; if $$\frac{L}{D} < 25v_D,$$

then the ratio of the length L to the diameter D of the circular solid rod specimen is changed, a new specimen is manufactured, and the said steps are repeated until the dynamic Poisson's ratio $v_D$ of the material is valid.

In an embodiment of the invention, the method of obtaining the fundamental longitudinal resonant frequency $f_l$ and the fundamental cross-sectional resonant frequency $f_d$ of the circular solid rod specimen comprises practicing an impact-echo method. Practicing the impact-echo method to obtain the fundamental longitudinal resonant frequency $f_l$ is placing a receiver in the central part of the top portion of the circular solid rod specimen, and impacting on the circular solid rod specimen with the receiver located beside to obtain a longitudinal frequency spectrum diagram of the circular solid rod specimen, then within the longitudinal frequency spectrum diagram, the frequency with the greatest amplitude is selected as the fundamental longitudinal resonant frequency $f_l$.

In addition, practicing the impact-echo method to obtain the fundamental cross-sectional resonant frequency $f_d$ is horizontally placing the circular solid rod specimen into a simply supported beam, and then placing a receiver in the $$\frac{L}{2}$$

location of the circular solid rod specimen, and impacting on a cross section of the circular solid rod specimen where the receiver is placed to obtain a cross-sectional frequency spectrum diagram of the circular solid rod specimen. Then, within the range of $$0.87\frac{L}{D}f_l \text{ to } 1.05\frac{L}{D}f_l,$$

the frequency with the greatest amplitude is selected as the fundamental cross-sectional resonant frequency $f_d$.

In an embodiment of the invention, a method of changing the ratio of the length L to the diameter D of the circular solid rod specimen is utilized. The method includes variations under different circumstances such as, increasing the length L of the circular solid rod specimen and maintaining the diameter D of the circular solid rod specimen, increasing the diameter D of the circular solid rod specimen and maintaining the length L of the circular solid rod specimen, decreasing the diameter D of the circular solid rod specimen and maintaining the length L of the circular solid rod specimen, decreasing the length L of the circular solid rod specimen and maintaining the diameter D of the circular solid rod specimen, or decreasing the L of the circular solid rod specimen and increasing the diameter D of the circular solid rod specimen.

Compared to conventional complicated methods of determining the dynamic Poisson's ratio of a material, the invention provides a simpler and easier method for determining the dynamic Poisson's ratio of a material much precisely.

In order to make the aforementioned and other features and advantages of the invention more comprehensible, embodiments accompanying figures are described in detail below.

DESCRIPTION OF EMBODIMENTS

The applicant derived the following related formulas for determining the dynamic Poisson's ratio of a circular solid rod specimen material through theoretical analysis, engineering numerical simulation software, linear regression, and testing. These formulas all relate to the numerical values of the fundamental cross-sectional resonant frequency $f_d$, fundamental longitudinal resonant frequency $f_l$, length L and diameter D of the circular solid rod specimen 200. Compared to the conventional ASTM E1876 standard method to determine the dynamic Poisson's ratio of a test material, the derived formulas of the applicant can conveniently determine the dynamic Poisson's ratio of the test material, omitting the complicated testing process. The following is a detailed description of the process of using the formulas to carry out the method.

Figure 1A:
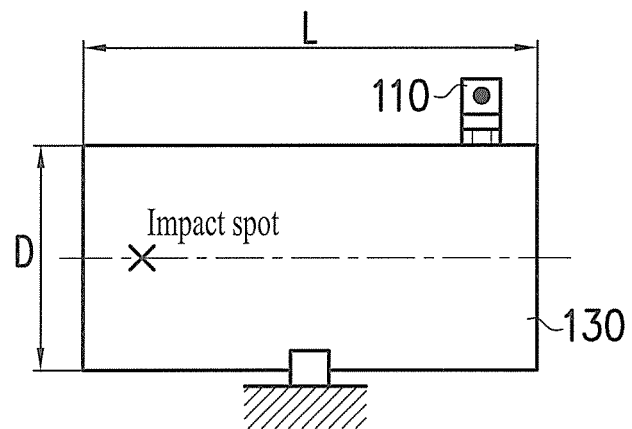
FIG. 1A is a schematic diagram of measuring the dynamic shear modulus of a circular solid rod specimen through ASTM C215.
Figure 1B:
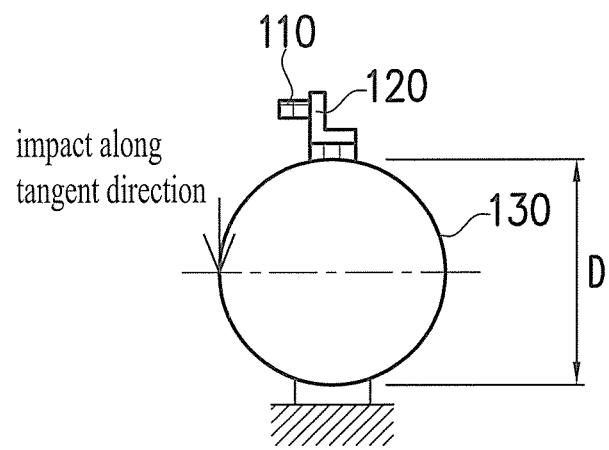
FIG. 1B is a schematic cross-sectional view of FIG. 1A.
Figure 2:
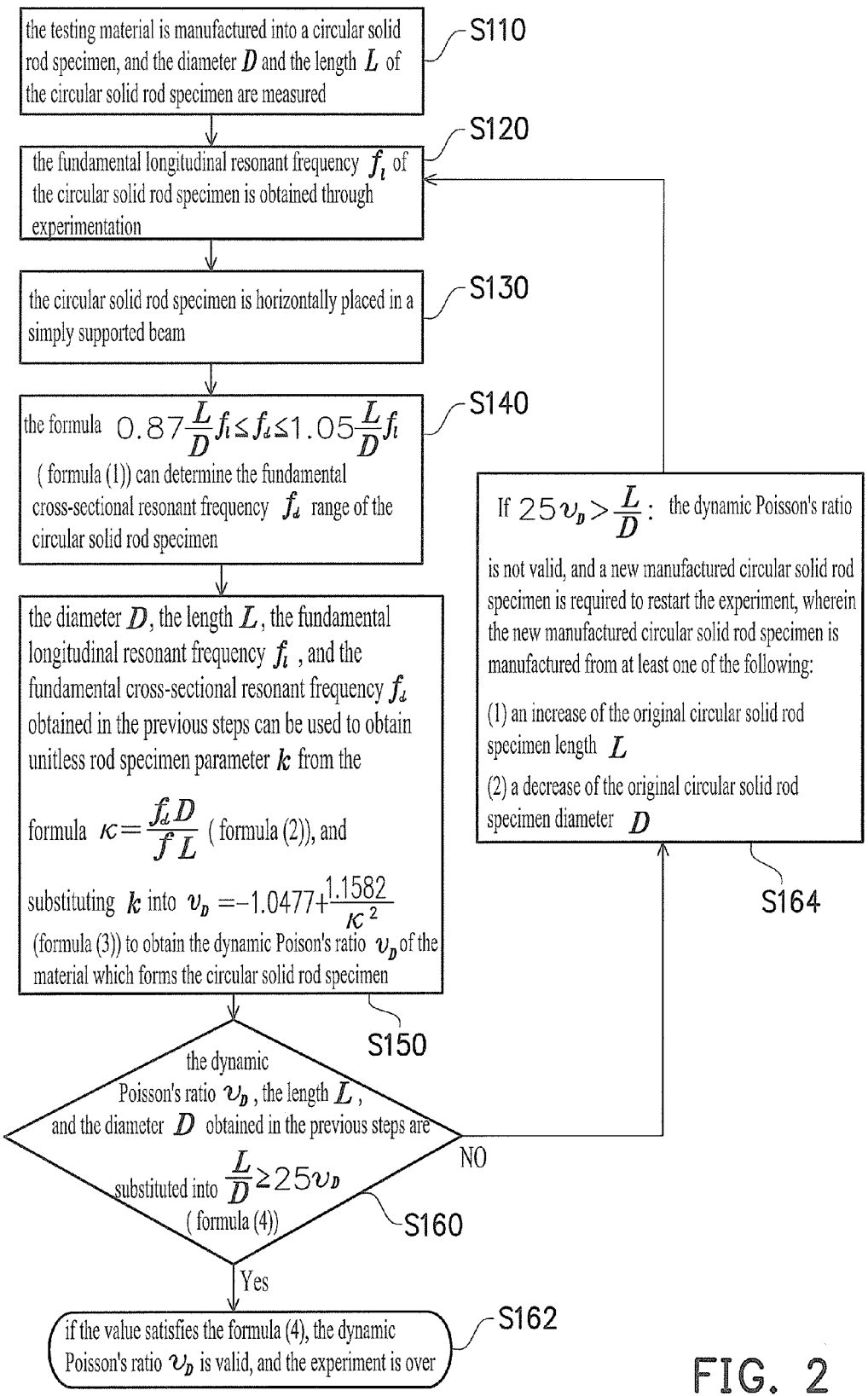
FIG. 2 is a flowchart of a method of determining the dynamic Poisson's ratio of a circular solid rod specimen of the invention.
Figure 3:
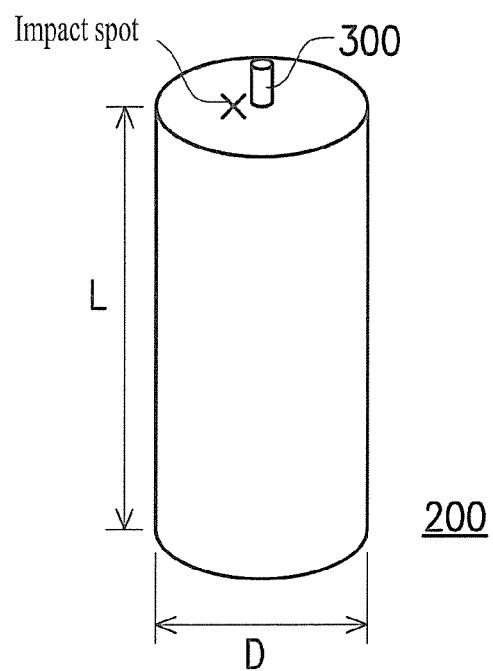
FIG. 3 is a schematic diagram of determining the fundamental longitudinal resonant frequency of a circular solid rod specimen.

Please refer to both FIG. 2 and FIG. 3. FIG. 2 shows a flowchart of a method of determining the dynamic Poisson's ratio of a circular solid rod specimen of the invention. FIG. 3 is a schematic diagram of the circular solid rod specimen. The method of determining the dynamic Poisson's ratio of a material with a circular solid rod specimen of the invention at least includes the following steps.

In step S110, the testing material is manufactured into a circular solid rod specimen 200, and the diameter D and the length L of the circular solid rod specimen 200 are measured.

Figure 4:
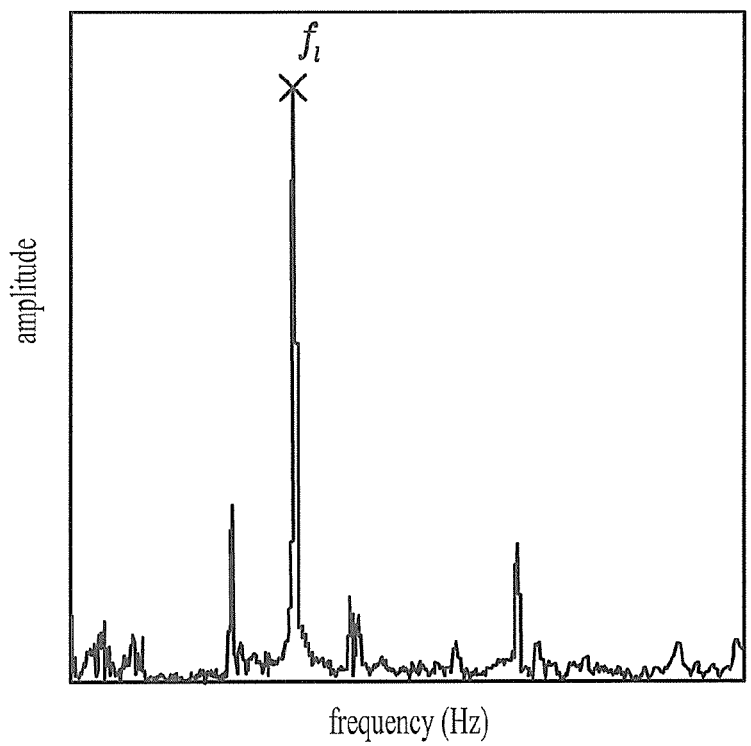
FIG. 4 is the fundamental longitudinal resonant frequency spectrum of a circular solid rod specimen.

In step S120, the fundamental longitudinal resonant frequency $f_l$ of the circular solid rod specimen 200 is obtained through experimentation. In the present embodiment, an impact-echo method is used to obtain the fundamental longitudinal resonant frequency $f_l$ of the circular solid rod specimen 200. In detail, the circular solid rod specimen 200 is placed vertically, and a receiver 300 is placed in the central part of the top portion of the circular solid rod specimen 200, and impacting the circular solid rod specimen 200 where the receiver 300 is located beside to obtain a longitudinal frequency spectrum diagram of the circular solid rod specimen (shown in FIG. 4). Within the longitudinal frequency spectrum diagram of FIG. 4, the frequency with the greatest amplitude is selected as the fundamental longitudinal resonant frequency $f_l$. The receiver 300 is placed in the central part of the top portion of the circular solid rod specimen 200, only as an example in the explanation, and is not used to limit the invention. The location of the receiver 300 can be designed towards practical requirements, for example the receiver 300 can also be placed close to the center of the circle on the top portion of the circular solid rod specimen 200.

Figure 5:
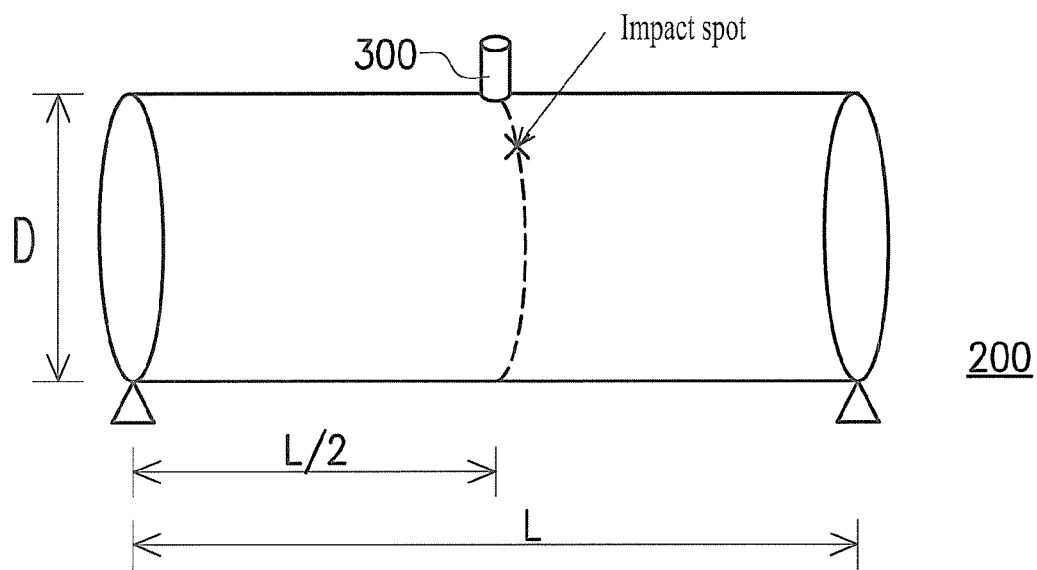
FIG. 5 is a schematic diagram of determining the cross-sectional resonant frequency of a circular solid rod specimen.
Figure 6:
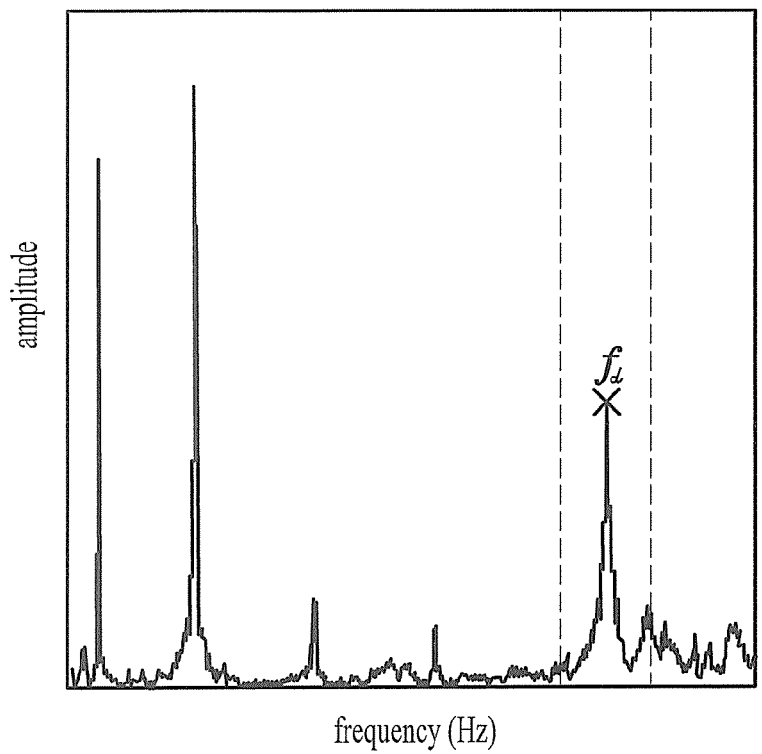
FIG. 6 is the cross-sectional resonant frequency spectrum of a circular solid rod specimen obtained according to FIG. 5.

Please refer to FIG. 2 and FIG. 5. In step S130, the circular solid rod specimen 200 is horizontally placed in a simply supported beam. Simultaneously, a receiver 300 is placed in the $$\frac{L}{2}$$

location of the circular solid rod specimen 200, and impacting the circular solid rod specimen 200 at a cross section of the circular solid rod specimen 200 where the receiver is placed to obtain a cross-sectional frequency spectrum diagram of the circular solid rod specimen 200 shown in FIG. 6.

Please refer to FIG. 2 and FIG. 6. In step S140, the formula $$0.87 \frac{L}{D} f_l \leq f_d \leq 1.05 \frac{L}{D} f_l \qquad \text{(formula (1))}$$

can determine the fundamental cross-sectional resonant frequency $f_d$ range of the circular solid rod specimen 200. Within the range, the frequency with the greatest amplitude in FIG. 6 is selected as the fundamental cross-sectional resonant frequency $f_d$ of the circular solid rod specimen 200. It should be mentioned that the in the present embodiment, an impact-echo method is practiced to obtain the fundamental longitudinal resonant frequency $f_l$ and the fundamental cross-sectional resonant frequency $f_d$ of the circular solid rod specimen 200. In other embodiments, ultrasound or laser methods can also be used, so as to obtain the fundamental longitudinal resonant frequency $f_l$ and the fundamental cross-sectional resonant frequency $f_d$ of the circular solid rod specimen 200, and is not limited to the impact-echo method.

In step S150, the diameter D, the length L, the fundamental longitudinal resonant frequency $f_l$, and fundamental cross-sectional resonant frequency $f_d$ obtained in the steps S110, S120, S130, and S140, can be used to obtain unitless rod specimen parameter κ from the formula $$\kappa = \frac{f_d D}{f_l L}. \qquad \text{(formula (2))}$$

Substituting the unitless rod specimen parameter κ into $$v_D = -1.0477 + \frac{1.1582}{\kappa^2}, \qquad \text{(formula (3))}$$

the dynamic Poison's ratio $v_D$ of the material which forms the circular solid rod specimen 200 is obtained.

Please refer to FIG. 2. In step S160, the dynamic Poisson's ratio $v_D$, the length L, and the diameter D obtained in the previous steps are substituted into $$\frac{L}{D} \geq 25 v_D. \qquad \text{(formula (4))}$$

If the value satisfies the formula (4), then the next step is step S162, which means the dynamic Poisson's ratio $v_D$ obtained through the method and calculations is valid, and the experiment is over.

If $$\frac{L}{D} < 25 v_D,$$

then the next step is step S164, which means the dynamic Poisson's ratio $v_D$ obtained through the method and calculations is not valid, and a new circular solid rod specimen is required, and the experiment is need to restart. Comparing the new circular solid rod specimen to the original circular solid rod specimen 200, and the length of the new circular solid rod specimen is greater than the length L of the original circular solid rod specimen length L, or the diameter D of the new circular solid rod specimen is smaller then the diameter D of the original circular solid rod specimen, or the length L of the new circular solid rod specimen is greater than that of the original circular solid rod specimen and the diameter D of the new circular solid rod specimen is smaller than that of the original circular solid rod specimen, so the ratio between the length L and diameter D of the new circular solid rod specimen is different from the ratio between the length L and diameter D of the original circular solid rod specimen. Afterwards, step S120 to step S160 are repeated, until the dynamic Poisson's ratio $v_D$ of the material is valid.

Compared to the conventional ASTM E1876 standard, which requires the ratio of the tested circular solid rod specimen 200 between the length L and diameter D to be greater than 20, the determining method in the invention only requires the ratio between the length L and the diameter D of the circular solid rod specimen 200 satisfies the formula (4)

$$\frac{L}{D} \geq 25 v_D.$$

Because the dynamic Poisson's ratio of a material falls between 0 and 0.5 ($0 \leq v_d \leq 0.5$), thus, in the invention, the dimensions required for the circular solid rod specimen 200 are smaller, which simplifies the manufacturing and is easy to test.

In addition, in the ASTM E1876 standard, the method for determining the dynamic Poisson's ratio of a circular solid rod specimen, needs to first obtain the dynamic elasticity modulus and the imprecise dynamic shear modulus. Furthermore, the method requires a complicated calculations process. In contrast, the method showed in the invention is simple. After the diameter D, the length L, the fundamental longitudinal resonant frequency $f_l$, and the fundamental cross-sectional resonant frequency $f_d$ of the circular solid rod specimen 200 are obtained through experimentation, substituting the parameters into the provided four formulas, the dynamic Poisson's ratio $v_D$ is obtained. In other words, the method provides a simpler, more convenient, and easier way to calculate the dynamic Poisson's ratio of a material.

To sum up, in the method of determining the dynamic Poisson's ratio of a circular solid rod specimen of the present invention, three formulas (formula (1), (2), and (3)) for calculating and one verification formula (formula (4)) are provided. In addition, the dimensions of the used circular solid rod specimen are smaller compared to a circular solid rod specimen used in a conventional determining method. This way, the circular solid rod specimen in the present invention is easier to be manufactured and the specimen volume is lighter and more convenient then the conventional specimen. Also, the testing method is simple, and a precise dynamic Poisson's ratio of a material is able to be easily obtained.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of determining the dynamic Poisson's ratio of a material, comprising:
   providing a circular solid rod specimen manufactured with the material to be determined for its dynamic Poisson's ratio and measuring a diameter D and a length L of the circular solid rod specimen;
   obtaining a fundamental longitudinal resonant frequency $f_l$ of the circular solid rod specimen;
   determining the circular solid rod specimen fundamental cross-sectional resonant frequency $f_d$ according to $$0.87 \frac{L}{D} f_l \leq f_d \leq 1.05 \frac{L}{D} f_l;$$

obtaining unitless rod specimen parameter κ according to $$\kappa = \frac{f_d D}{f_l L},$$

and then obtaining the dynamic Poisson's ratio $v_D$ according to $$v_D = -1.0477 + \frac{1.1582}{\kappa^2};$$

justifying the validity of the dynamic Poisson's ratio $v_D$ of the material, wherein if $$\frac{L}{D} \geq 25 v_D,$$

then the Poisson's ratio $v_D$ of the material is valid; and if $$\frac{L}{D} < 25 v_D,$$

then changing the ratio of the length L to the diameter D of the circular solid rod specimen to manufacture a new specimen, and repeating the said steps until the dynamic Poisson's ratio $v_D$ of the material is valid.

2. The method of determining the dynamic Poisson's ratio of a material of claim 1, wherein the method of obtaining the fundamental cross-sectional resonant frequency $f_d$ and the fundamental longitudinal resonant frequency $f_l$ of the circular solid rod specimen comprises an impact-echo method.

3. The method of determining the dynamic Poisson's ratio of a material of claim 2, wherein practicing the impact-echo method to obtain the fundamental longitudinal resonant frequency $f_l$ is placing a receiver placed in the central part of the top portion of the circular solid rod specimen, and impacting on a location of the circular solid rod specimen where the receiver is aside and a longitudinal frequency spectrum diagram of the circular solid rod specimen is obtained, then within the longitudinal frequency spectrum diagram, the frequency with the greatest amplitude is selected as the fundamental longitudinal resonant frequency $f_l$.

4. The method of determining the dynamic Poisson's ratio of a material of claim 2, wherein practicing the impact-echo method to obtain the fundamental cross-section resonant frequency $f_d$ is placing the circular solid rod specimen horizontally to serve as a simply supported beam, and then placing a receiver in the $$\frac{L}{2}$$

location of the circular solid rod specimen, and impacting the circular solid rod specimen at a cross section of the circular solid rod specimen where the receiver is placed, to obtain a cross-sectional frequency spectrum diagram of the circular solid rod specimen, then within the range of $$0.87 \frac{L}{D} f_l \text{ to } 1.05 \frac{L}{D} f_l,$$

the frequency with the greatest amplitude is selected as the fundamental cross-sectional resonant frequency $f_d$.

5. The method of determining the dynamic Poisson's ratio of a material of claim 1, wherein the method of changing the ratio of the length L to the diameter D of the circular solid rod specimen includes increasing the circular solid rod specimen length L and maintaining the circular solid rod specimen diameter D, increasing the circular solid rod specimen diameter D and maintaining the circular solid rod specimen length L, decreasing the circular solid rod specimen diameter D and maintaining the circular solid rod specimen length L, decreasing the circular solid rod specimen length L and maintaining the circular solid rod specimen diameter D, or decreasing the circular solid rod specimen length L and increasing the circular solid rod specimen diameter D.

* * * * *